US008971496B2

(12) United States Patent
Okamoto et al.

(10) Patent No.: US 8,971,496 B2
(45) Date of Patent: Mar. 3, 2015

(54) X-RAY WAVEGUIDE

(75) Inventors: Kohei Okamoto, Yokohama (JP); Atsushi Komoto, Moriya (JP); Wataru Kubo, Inagi (JP); Hirokatsu Miyata, Hadano (JP); Takashi Noma, Hadano (JP)

(73) Assignee: Canon Kabushiki Kaisha, Tokyo (JP)

(*) Notice: Subject to any disclaimer, the term of this patent is extended or adjusted under 35 U.S.C. 154(b) by 288 days.

(21) Appl. No.: 13/697,497

(22) PCT Filed: May 20, 2011

(86) PCT No.: PCT/JP2011/062155
§ 371 (c)(1),
(2), (4) Date: Nov. 12, 2012

(87) PCT Pub. No.: WO2011/152291
PCT Pub. Date: Dec. 8, 2011

(65) Prior Publication Data

US 2013/0058461 A1 Mar. 7, 2013

(30) Foreign Application Priority Data

Jun. 2, 2010 (JP) ................................ 2010-127340
Nov. 25, 2010 (JP) ................................ 2010-262877
Apr. 28, 2011 (JP) ................................ 2011-101310

(51) Int. Cl.
*G21K 1/06* (2006.01)
*G02B 6/028* (2006.01)
(Continued)

(52) U.S. Cl.
CPC . *G21K 1/06* (2013.01); *H01J 11/44* (2013.01); *H01J 35/065* (2013.01); *G21K 2201/067* (2013.01)
USPC ............ 378/145; 378/210; 385/133; 385/146

(58) Field of Classification Search
USPC ........... 378/84, 145, 146, 147, 156, 104, 210; 385/123–126, 132, 141, 142, 144, 146, 385/147
See application file for complete search history.

(56) References Cited

U.S. PATENT DOCUMENTS 3,893,231 A 7/1975 Anderson ....................... 29/600
4,087,159 A * 5/1978 Ulrich ........................... 385/129
(Continued)

FOREIGN PATENT DOCUMENTS

CN 1853123 10/2006
EP 1758132 A 2/2007

OTHER PUBLICATIONS

Office Action issued Sep. 2, 2014, in Chinese (P.R.C.) counterpart patent application 201180026105.9, with translation.
(Continued)

*Primary Examiner* — Bernard E Souw
(74) *Attorney, Agent, or Firm* — Fitzpatrick, Cella, Harper & Scinto

(57) ABSTRACT

An X-ray waveguide showing a small propagation loss and having a waveguide mode with its phase controlled is provided. The X-ray waveguide including: a core for guiding an X-ray in a wavelength band that a real part of the refractive index of a material is 1 or less; and a cladding for confining the X-ray in the core, in which: the X-ray is confined in the core by total reflection at a interface between the core and the cladding; in the core multiple materials having different real parts of the refractive index are periodically arranged; and a waveguide mode of the X-ray waveguide is such that the number of antinodes or nodes of an electric field intensity distribution or a magnetic field intensity distribution of the X-ray coincides with the number of periods of the periodic structure in a direction perpendicular to a waveguiding direction of the X-ray in the core.

6 Claims, 4 Drawing Sheets

(51) Int. Cl.

| | |
|---|---|
| ***G02B 6/036*** | (2006.01) |
| ***H01J 11/44*** | (2012.01) |
| ***H01J 35/06*** | (2006.01) |

(56) References Cited

U.S. PATENT DOCUMENTS

| | | | | |
|---|---|---|---|---|
| 6,452,184 | B1 | 9/2002 | Taskar et al. | 250/367 |
| 8,559,600 | B2 * | 10/2013 | Okamoto et al. | 378/145 |
| 2006/0078263 | A1 | 4/2006 | Kittaka et al. | 385/129 |
| 2011/0129065 | A1 | 6/2011 | Komoto et al. | |
| 2011/0299661 | A1 * | 12/2011 | Okamoto et al. | 378/145 |
| 2011/0299662 | A1 * | 12/2011 | Okamoto et al. | 378/145 |
| 2013/0039477 | A1 * | 2/2013 | Okamoto et al. | 378/145 |
| 2013/0142312 | A1 * | 6/2013 | Okamoto et al. | 378/145 |

OTHER PUBLICATIONS

Jarre et al., "X-ray waveguide nanostructures: Design, fabrication, and characterization", Journal of Applied Physics, No. 101, pp. 054306-1 to 054306-6 (2007).

Prudnikov, "X-ray waveguides based on Bragg scattering of multilayers", Physical Review B, vol. 67, No. 23, pp. 233303-1 to 233303-4 (2003).

Pfeiffer et al., "X-Ray Waveguides with Multiple Guiding Layers", Physical Review. B, Condensed Matter and Materials Physics, American Institute of Physics, Woodbury, NY, US, vol. 62, No. 24, Dec. 15, 2000, pp. 16939-16943.

A. Jarre et al., "Two Dimensional Hard X-Ray Beam Compression by Combined Focusing and Waveguide Optics", Physical Review Letters, vol. 94, No. 7, pp. 074801-1 to 074801-4, Feb. 1, 2005.

* cited by examiner

X-RAY WAVEGUIDE

TECHNICAL FIELD

The present invention relates to an X-ray waveguide, in particular, an X-ray waveguide to be used in an X-ray optical system in, for example, an X-ray analysis technology, an X-ray imaging technology, or an X-ray exposure technology.

BACKGROUND ART

When an electromagnetic wave having a short wavelength of several tens of nanometers or less is dealt with, a difference in refractive index for any such electromagnetic wave between different materials is extremely small, specifically, $10^{-4}$ or less, and for example, a the critical angle for total reflection becomes extremely smaller. In view of the foregoing, a large-scale spatial optical system is usually used for controlling such electromagnetic wave including an X-ray. Among main parts of which the spatial optical system is formed is a multilayer mirror obtained by alternately laminating materials having different refractive indices, and this multilayer mirror is playing various roles such as beam shaping, spot size conversion, and wavelength selection.

A conventional X-ray waveguide such as a polycapillary propagates, in contrast to such spatial optical system, which has been in the mainstream, an X-ray by confining the X-ray in itself. Researches have been recently conducted on an X-ray waveguide, which propagates an X-ray by confining the X-ray in a thin film or a multilayer film with a view to reducing the size, and improving the performance, of an optical system.

Specifically, researches have been conducted on, for example, multiple X-ray waveguides each formed so that an X-ray is confined in a two-dimensional direction by total reflection, the X-ray waveguides being placed so as to be adjacent to each other (see NPL 1), and a thin-film waveguide of such a shape that a waveguide layer is interposed between two layers of one-dimensional periodic structures (see NPL 2).

CITATION LIST

Non Patent Literature

NPL 1: "Journal Of Applied Physics", Number 101, p. 054306 (2007)

NPL 2: "Physical Review B", Volume 67, Number 23, p. 233303 (2003)

SUMMARY OF INVENTION

Technical Problem

In NPL 1, however, the propagation loss of an X-ray increases because each cladding layer is formed of a material having a large electron density to confine the X-ray by total reflection in each basic waveguide that forms a periodic structure. In addition, problems such as the oxidation degradation of a waveguide exist because the selectivity of kinds of materials for use in the cladding is low, and most of the materials are materials that are readily oxidized. Further, the step of producing a structure based on any such material by a semiconductor process requires time and labor. In addition, an arrangement by the respective multiple basic waveguides is a one-dimensional arrangement while the X-ray is confined in the two-dimensional direction, and hence the control of a propagating X-ray by means of the arrangement is limited to one-dimensional control.

In addition, NPL 2 has proposed an X-ray waveguide that confines an X-ray in a core by Bragg reflection at a multilayer film provided as a cladding. However, the multilayer film is formed of Ni and C, and the lamination of a sufficient number of layers of such materials requires extremely long time and labor. Further, the absorption loss of the X-ray in the multilayer film increases because a metal material that absorbs the X-ray to a large extent is used. In addition, such a problem that the waveguide degrades owing to oxidation exists. As in the case of NPL 1, the control of the X-ray with the arrangement of the multilayer film is limited to one-dimensional control.

The present invention has been made in view of such conventional problems as described above, and an object of the present invention is to provide an X-ray waveguide which shows a low propagation loss of an X-ray and has a waveguide mode with its phase controlled.

In an aspect of the present invention, An X-ray waveguide, including: a core for guiding an X-ray in such a wavelength band that a real part of the refractive index of a material is 1 or less; and a cladding for confining the X-ray in the core, in which: the core and the cladding are formed so that the X-ray is confined in the core by total reflection at a interface between the core and the cladding and thus the X-ray is guided; the core has a periodic structure in which multiple materials having different real parts of the refractive index are periodically arranged in a two-dimensional direction perpendicular to the waveguiding direction; and the X-ray waveguide has such a waveguide mode that the number of one of antinodes and nodes of one of an electric field intensity distribution and a magnetic field intensity distribution of the X-ray coincides with the number of periods of the periodic structure in a direction perpendicular to a waveguiding direction of the X-ray in the core, is provided.

Any other aspect of the present invention is elucidated in an embodiment to be described below.

Advantageous Effects of Invention

According to the present invention, there can be provided an X-ray waveguide which: shows a low propagation loss of an X-ray; and can form a single waveguide mode with its phase controlled.

Further features of the present invention will become apparent from the following description of exemplary embodiments with reference to the attached drawings.

DESCRIPTION OF EMBODIMENTS

Figure 1A:
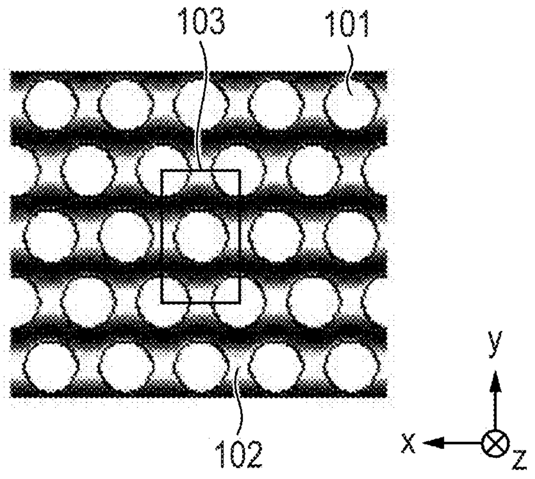
FIG. 1A is a schematic view illustrating an embodiment of electric field intensity distribution of periodic resonant waveguide mode in an X-ray waveguide of the present invention.

Hereinafter, the present invention is described in detail.

The term "X-ray" as used in the present invention refers to electromagnetic waves in such a wavelength band that the real part of the refractive index of a material is 1 or less. Specifically, the term "X-ray" as used in the present invention refers to electromagnetic waves each having a wavelength of 100 nanometers or less including extreme ultraviolet light (EUV light). Since an electromagnetic wave having such short wavelength has an extremely high frequency, an electron in the outermost shell of a material cannot respond to the frequency. Therefore, it is known that the real part of the refractive index of the material for an X-ray is smaller than 1 unlike the frequency band of an electromagnetic wave (visible light or infrared light) having a wavelength longer than that of ultraviolet light. As represented in the following formula (1), such refractive index n of a material for an X-ray is generally represented by using a decrement δ of a real part from 1 and an imaginary part β' related to absorption.

$$n=1-\delta-i\beta'=n'-i\beta' \quad (1)$$

Because the δ is proportional to an electron density $\rho_e$ of the material, the real part of the refractive index reduces as the electron density of the material increases. In addition, the real part of the refractive index n' is 1-δ. Further, the $\rho_e$ is proportional to an atomic density $\rho_a$ and an atomic number Z. As described above, the refractive index of a material for an X-ray is represented in terms of a complex number. In the description, the real part of the complex number is referred to as a "refractive index real part" or a "real part of the refractive index", and the imaginary part of the complex number is referred to as a "refractive index imaginary part" or an "imaginary part of the refractive index".

The case where a real part of the refractive index for an X-ray becomes maximum is the case where the X-ray propagates in a vacuum. Under a general environment, however, the real part of the refractive index of air for nearly all materials except gases becomes maximum. In the description, the term "material" is applied to a vacuum as well. In the present invention, multiple materials having different real parts of the refractive index can be interpreted as two or more kinds of materials having different electron densities in many cases. The minimum unit structure that forms a periodic structure is referred to as a "unit structure" in the description.

An X-ray waveguide of the present invention confines an X-ray in a core by total reflection at an interface between the core and a cladding to guide the X-ray. In order that the total reflection may be realized, the X-ray waveguide of the present invention is preferably such that in the vicinity of the interface between the core and the cladding, the real part of the refractive index of the core is larger than the real part of the refractive index of the cladding. A critical angle for total reflection at this time is represented by $\theta_c$ as an angle from the surface.

The core of the X-ray waveguide of the present invention can perform the two- or three-dimensional phase control of a waveguide mode, and the spatial intensity distribution control of the mode because the core is of a two or more-dimensional periodic structure based on at least two kinds of materials having different real parts of the refractive index. The periodic structure, which has only to be a two- or three-dimensional periodic structure, has a two-dimensional periodicity in a plane perpendicular to the waveguiding direction of the X-ray. Waveguiding direction means the guiding direction of X-ray of a waveguide mode. Such periodic structure can be produced by a conventional semiconductor process such as photolithography, electron beam lithography, an etching process, lamination, or attachment as well. In addition, for example, the degradation of the waveguide due to oxidation can be prevented when at least one material out of the multiple materials having different real parts of the refractive index of which the periodic structure is formed is an oxide. The application of a semiconductor process involving the use of an oxide enables the production of a periodic structure having the oxide.

In addition, a material of which the periodic structure is formed is, for example, a mesoporous material of a mesostructured film as one of the porous materials, the material being produced by a self-organizing formation mechanism different from an ordinary semiconductor process. The porous materials are classified by the International Union of Pure and Applied Chemistry (IUPAC) depending on their pore diameters, and a porous material having a pore diameter of 2 to 50 nm is classified as being mesoporous. Researches have been vigorously conducted on the mesoporous material in recent years, and as a result, a structure in which meso pores having a uniform diameter are regularly arranged can be obtained by using an assembly of a surfactant as a template.

Here, the term "mesostructured film" as used in the present invention refers to (A) a mesoporous film and (B) a mesoporous film whose pores are mainly filled with an organic compound, the films each having a two- or three-dimensional structural period.

Detailed description is given below.

(A) Mesoporous Film

The mesoporous film is a porous material having a pore diameter of 2 to 50 nm, and a material for a wall part, which is not particularly limited, is, for example, an inorganic oxide in terms of manufacturability. Examples of the inorganic oxide include silicon oxide, tin oxide, zirconia oxide, titanium oxide, niobium oxide, tantalum oxide, aluminum oxide, tungsten oxide, hafnium oxide, and zinc oxide. The surface of the wall part may be modified as necessary. For example, the surface of the wall part may be modified with a hydrophobic molecule for inhibiting the adsorption of water.

Although a method of preparing the mesoporous film is not particularly limited, the film can be prepared by, for example, the following method. A precursor for the inorganic oxide is added to a solution of an amphipathic material whose assembly functions as a template to perform film formation so that a reaction for producing the inorganic oxide may be advanced. After that, template molecules are removed so that the porous material may be obtained.

The amphipathic material, which is not particularly limited, is suitably a surfactant. Examples of the surfactant include ionic and nonionic surfactants. The ionic surfactant is, for example, a halide salt of a trimethylalkylammonium ion. The chain length of the alkyl chain is, for example, 10 to 22 in terms of a carbon number. Examples of the nonionic surfactant include surfactants each containing polyethylene glycol as a hydrophilic group. Specific examples of the surfactants each containing polyethylene glycol as a hydrophilic group include a polyethylene glycol alkyl ether and a polyethylene glycol-polypropylene glycol-polyethylene glycol block copolymer. The chain length of the alkyl chain of the polyethylene glycol alkyl ether is, for example, 10 to 22 in terms of a carbon number, and the number of repetitions of the polyethylene glycol is, for example, 2 to 50. The structural period can be changed by changing the hydrophobic group or hydrophilic group. In general, a pore diameter can be extended by making a hydrophobic group or hydrophilic group large.

In addition, an additive for adjusting a structural period may be added as well as the surfactant. The additive for adjusting a structural period is, for example, a hydrophobic material. Examples of the hydrophobic material include alkanes and aromatic compounds free of hydrophilic groups. The hydrophobic material is specifically, for example, octane.

Examples of the precursor for the inorganic oxide include an alkoxide and a chloride of silicon or a metal element. More specific examples thereof include an alkoxide and a chloride of Si, Sn, Zr, Ti, Nb, Ta, Al, W, Hf, or Zn. Examples of the alkoxide include a methoxide, an ethoxide, a propoxide, and an alkoxide partly substituted with an alkyl group.

Examples of the film-forming method include a dip coating method, a spin coating method, and a hydrothermal synthesis method. Examples of the method of removing the template molecules include calcination, extraction, ultraviolet irradiation, and ozonation.

(B) Mesoporous Film Whose Pores are Mainly Filled with Organic Compound

Any one of the same materials as those described in the section (A) can be used as a material for a wall part. The material with which each pore is filled is not particularly limited as long as the material is mainly formed of an organic compound. The term "mainly" here means that a volume ratio of the organic compound to the material is 50% or more. The organic compound is, for example, a surfactant or a material in which a site having a function of forming a molecular assembly is bonded to the material of which a wall part is formed or a precursor for the material of which a wall part is formed. Examples of the surfactant include the surfactants described in the section (A). In addition, examples of the material in which the site having a function of forming a molecular assembly is bonded to the material of which a wall part is formed or the precursor for the material of which a wall part is formed include an alkoxysilane having an alkyl group and an oligosiloxane compound having an alkyl group. The chain length of the alkyl chain is, for example, 10 to 22 in terms of a carbon number.

The inside of each pore may contain water, an organic solvent, a salt, or the like as required, or as a result of a material to be used or a step. Examples of the organic solvent include an alcohol, ether, and a hydrocarbon.

A method of preparing the mesoporous film whose pores are mainly filled with the organic compound, which is not particularly limited, is, for example, a step before the template removal of the method of preparing the mesoporous film described in the section (A).

A mesoporous material whose pores are filled with a metal, a semiconductor, or the like by, for example, a post treatment step of film formation can also be utilized.

Another material is, for example, a so-called artificial opal structure of a three-dimensional periodic structure where polystyrene spheres each having a diameter of about 50 nm are arranged into a hexagonal close-packed structure in a self-organizing fashion.

In the present invention, a waveguide mode resulting from a periodicity can be caused to exist as a waveguide mode to be formed in the X-ray waveguide because the core is formed of a two or more-dimensional periodic structure formed of multiple materials having different real parts of the refractive index. The waveguide mode resulting from the periodicity is referred to as a "periodic resonant waveguide mode" in the description. When the number of periods of the periodic structure having different real parts of the refractive index is infinite, a photonic band is formed between a propagation constant and the angular frequency of an X-ray, and an X-ray of a specific mode resulting from the periodicity is dominantly present in the structure. The mode results from two-dimensional Bragg diffraction when the periodic structure is two-dimensional, or from three-dimensional Bragg diffraction when the periodic structure is three-dimensional. In addition, since such mode is formed by the periodicity, the position of an antinode or node of its electric field distribution or electric field intensity distribution coincides with a position in each material region of which the unit structure is formed.

Figure 1B:
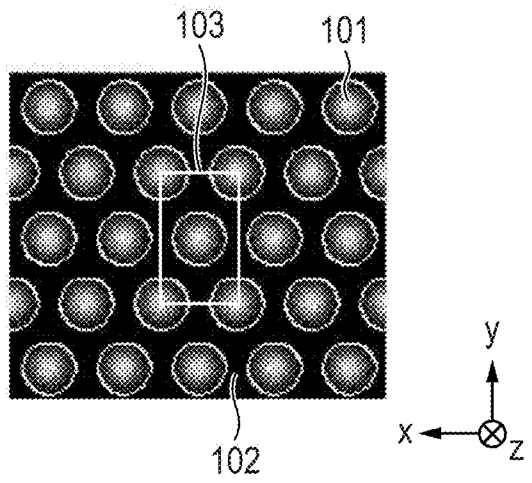
FIG. 1B is a schematic view illustrating an embodiment of electric field intensity distribution of periodic resonant waveguide mode in the X-ray waveguide of the present invention.

FIG. 1A and FIG. 1B each illustrate part of an example of the core of the X-ray waveguide of the present invention. The part of the core is formed of multiple materials having different real parts of the refractive index, and has a two-dimensional periodic structure. Here, a z direction is the waveguiding direction of an X-ray, and a silica part 102, an air pore that elongates in the z direction 101, and an example of the unit structure 103 of which the periodic structure is formed are represented.

FIG. 1A illustrates an exemplary electric field intensity distribution in such a material that air pores that elongate in one direction in silica form a two-dimensional, triangular lattice structure in a direction (direction in an x-y plane) perpendicular to the lengthwise direction of each pore (z direction in the figure). FIG. 1A illustrates an electric field intensity distribution for one-dimensional periodic resonant waveguide mode in the periodic structure where solid lines represent the periodic structure, and light and dark colors represent an electric field intensity. The light color corresponds to a high of the electric field intensity, and the dark color corresponds to a low of the electric field intensity. It can be found that regions serving as the local maximum and local minimum of the electric field intensity are periodically repeated in a y direction. The electric field intensity distribution of such mode resulting from the periodicity is a periodic distribution in the x-y plane in the figure, and its period coincides with, or is smaller than, a period in a specific direction of a one-dimensional periodic structure formed by the air pores 101 and the silica parts 102. In this case, the specific direction is the y direction.

FIG. 1B is an example illustrating the electric field intensity distribution of such a two-dimensional periodic resonant waveguide mode that the period of the electric field intensity distribution is smaller than the period of the periodic structure. It can be found that the periodicity of the electric field intensity distribution is affected by the two-dimensional periodicity of the periodic structure so as to be two-dimensional. In such case, the specific direction is the direction of high symmetry out of directions in the x-y plane.

When such mode is confined in the core with the claddings, the periodic resonant waveguide mode is formed, and hence the X-ray can be guided. The core of the X-ray waveguide of the present invention is not of a periodic structure that infinitely continues, but has a finite thickness interposed between the claddings, in other words, a finite number of periods in the direction perpendicular to the interface between each cladding and the core. As a result, a waveguide mode when the entire core is regarded as an uniform medium having an approximately average refractive index as well as the periodic resonant waveguide mode exists, and is referred to as a "uniform waveguide mode".

Figure 2:
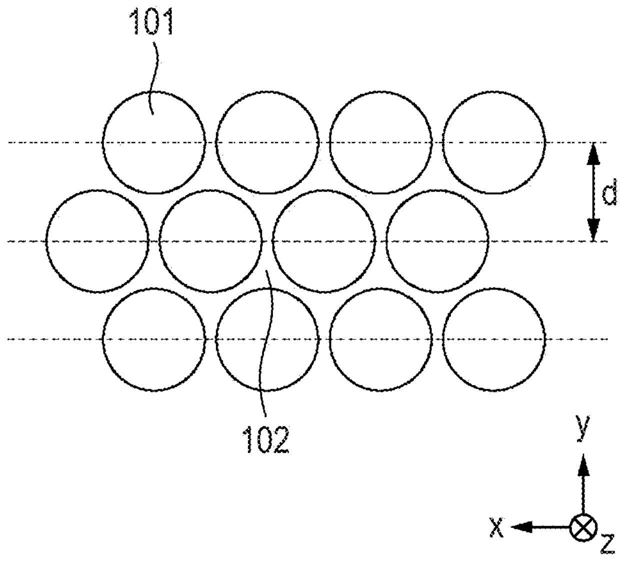
FIG. 2 is a diagram illustrating a period d in the confining direction of a periodic structure.

In contrast to the uniform waveguide mode, the periodic resonant waveguide mode to be used in the X-ray waveguide of the present invention shows so small a loss that it dominantly behaves like a single mode in the waveguide modes and that its phase is matched in a two- or three-dimensional direction. The phrase "phase of the waveguide mode is matched" as used in the present invention refers not only to that a phase difference of electromagnetic field in a plane perpendicular to the waveguiding direction is zero but also to that the phase difference of the electromagnetic field periodically changes between $-\pi$ and $+\pi$ in correspondence with the spatial refractive index distribution of the periodic structure. The above-mentioned periodic resonant waveguide mode as well as the uniform waveguide mode is formed by total reflection at the interface between each cladding and the core. Accordingly, the X-ray waveguide of the present invention is preferably designed so that a period d in the direction perpendicular to the waveguiding direction and to the interface between each cladding and the core may satisfy the following formula (2). The term "d" as used herein is defined as the period of a plane formed with the z direction as the waveguiding direction in the y direction in the periodic structure (direction perpendicular to the waveguiding direction and to the interface between each cladding and the core) as illustrated in FIG. 2. When the two interfaces between the claddings and the core are parallel to each other, and the core is placed so as to be interposed between the two claddings, a confining direction in the description is desirably a direction parallel to one fundamental vector of the periodic structure and perpendicular to the waveguiding direction, provided that a specific direction can be defined as a direction connecting arbitrary points on the interfaces between the two claddings and the core when the fundamental vector is not perpendicular to the interface between each cladding and the core.

$$\theta_c > \theta_{B-y} \approx \frac{180}{z}\arcsin\left(\frac{1}{n'}\frac{\lambda}{2d}\right) \quad (2)$$

$\theta_{B-y}$ (°) represents a Bragg angle based on the period d in the y direction (direction perpendicular to the waveguiding direction of the X-ray and to the interface between each cladding and the core), $\lambda$ represents the wavelength of the X-ray, and n' represents the average refractive index of the core.

Under the condition, not only the uniform waveguide mode but also the periodic resonant waveguide mode is present in the X-ray waveguide. The periodic resonant waveguide mode is merely such that a mode formed in a periodic structure that infinitely continues is modulated by a waveguide structure. As a result, a antinode part as the local maximum of the electric field intensity (or magnetic field intensity) of the electric field intensity distribution (or magnetic field intensity distribution) of the waveguide mode in the plane perpendicular to a propagation direction and a node part of the distribution each coincide with the unit structure of the periodic structure. In other words, the number of antinodes or nodes of the electric field intensity distribution (or magnetic field intensity distribution) in the confining direction is equal to or larger than the number of periods of the periodic structure.

Figure 3:
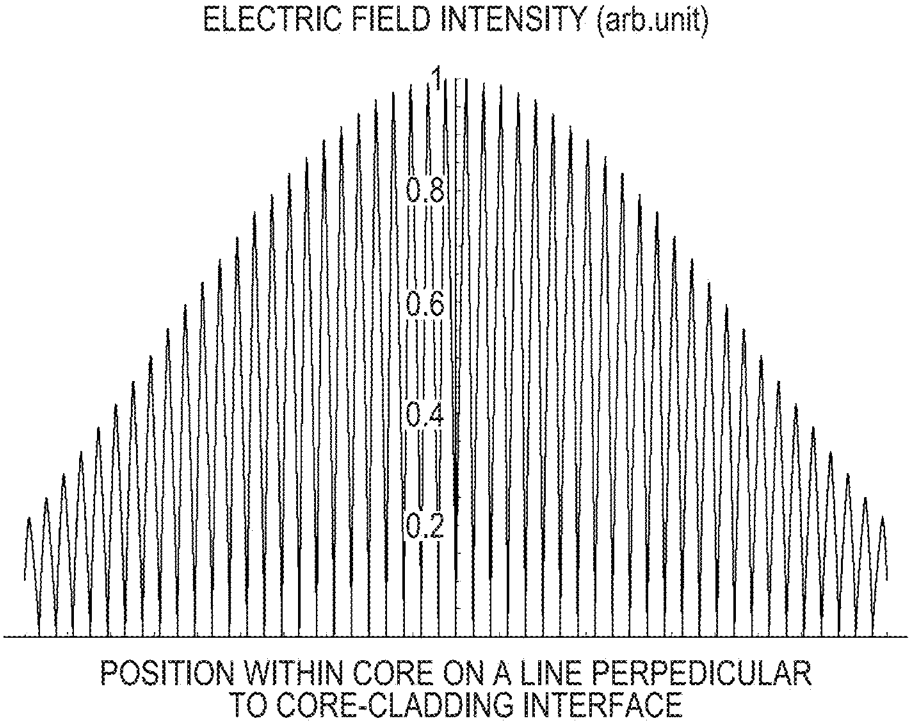
FIG. 3 is a view illustrating an electric field intensity distribution.

Because the periodic resonant waveguide mode shows a loss extremely small as compared with that of the multimode of the uniform waveguide mode, the X-ray can be guided with an extremely small loss. FIG. 3 illustrates the electric field intensity distribution in the core of the periodic resonant waveguide mode on a line in the plane perpendicular to the waveguiding direction. As can be seen from FIG. 3, the electric field converges on the vicinity of the center of the core and small amount of evanescent field exists in the cladding, and hence a waveguide mode with its phase matched can be realized. Those advantages of the periodic resonant waveguide mode become more remarkable with increasing number of periods. The number of periods of the two or more-dimensional periodic structure as the core of the X-ray waveguide of the present invention is preferably 20 or more in the direction perpendicular to the waveguiding direction of the X-ray.

When the real part of the refractive index of the material on a cladding side at the interface between each cladding and the core is represented by $n_{clad}$ and the real part of the refractive index of the material on a core side at the interface is represented by $n_{core}$, a the critical angle for total reflection $\theta_c$ (°) from a direction parallel to a film surface is represented by the following formula (3) on a condition that the $n_{clad}$ is smaller than the $n_{core}$.

$$\theta_C = \frac{180}{\pi}\arccos\left(\frac{n_{clad}}{n_{core}}\right) \quad (3)$$

Each of the claddings of the X-ray waveguide of the present invention can be formed of such a material that the other structure parameters and physical property parameters of the waveguide satisfy the formula (2). For example, when a mesoporous silica of such a two-dimensional periodic structure that air pores are arranged in a triangular lattice fashion with a period of 10 nm in the confining direction is used in the core, each cladding can be formed of Au, W, Ta, or the like. With such configuration, the X-ray waveguide of the present invention can guide an X-ray by forming a periodic resonant waveguide mode which: results from a periodicity; has a two- or three-dimensionally controlled phase; and shows a low loss.

In the X-ray waveguide of the present invention, part of the core preferably serves as a cladding. Alternatively, the X-ray waveguide of the present invention can be formed so that part of the core may function as each of the claddings. In this case, an X-ray undergoes total reflection between different materials that form the unit structures of the periodic structure as the core, and hence the X-ray is confined in the region of the material having a large real part of the refractive index of each unit structure of the periodic structure and is then guided. Accordingly, there is no need to set a cladding structure different from the periodic structure because the foregoing is equivalent to the possession of a cladding by the periodic structure itself called the core. For example, when a mesoporous silica with pores oriented in the waveguiding direction of an X-ray is used in the waveguide, the silica part in each unit structure functions as a cladding, and the air part in each unit structure functions as a core. In the entire periodic structure, an X-ray confined in each core is coupled via evanescent field with an X-ray confined in an adjacent core. As a result, such a waveguide mode that guided X-rays are coupled with each other is formed in the entire periodic structure. A material that realizes such waveguide is, for example, a mesoporous silica, a nanoporous alumina, or a material formed through patterning and an etching process by photolithography, electron beam lithography, or the like. In particular, when a region in each unit structure where an X-ray is confined and then guided is air, the propagation loss of the X-ray of such waveguide mode can be made extremely low.

The core is preferably formed of a mesoporous material. In addition, the core is preferably formed of a structure in which particles are periodically arranged in a three-dimensional direction.

EXAMPLE 1

Figure 4:
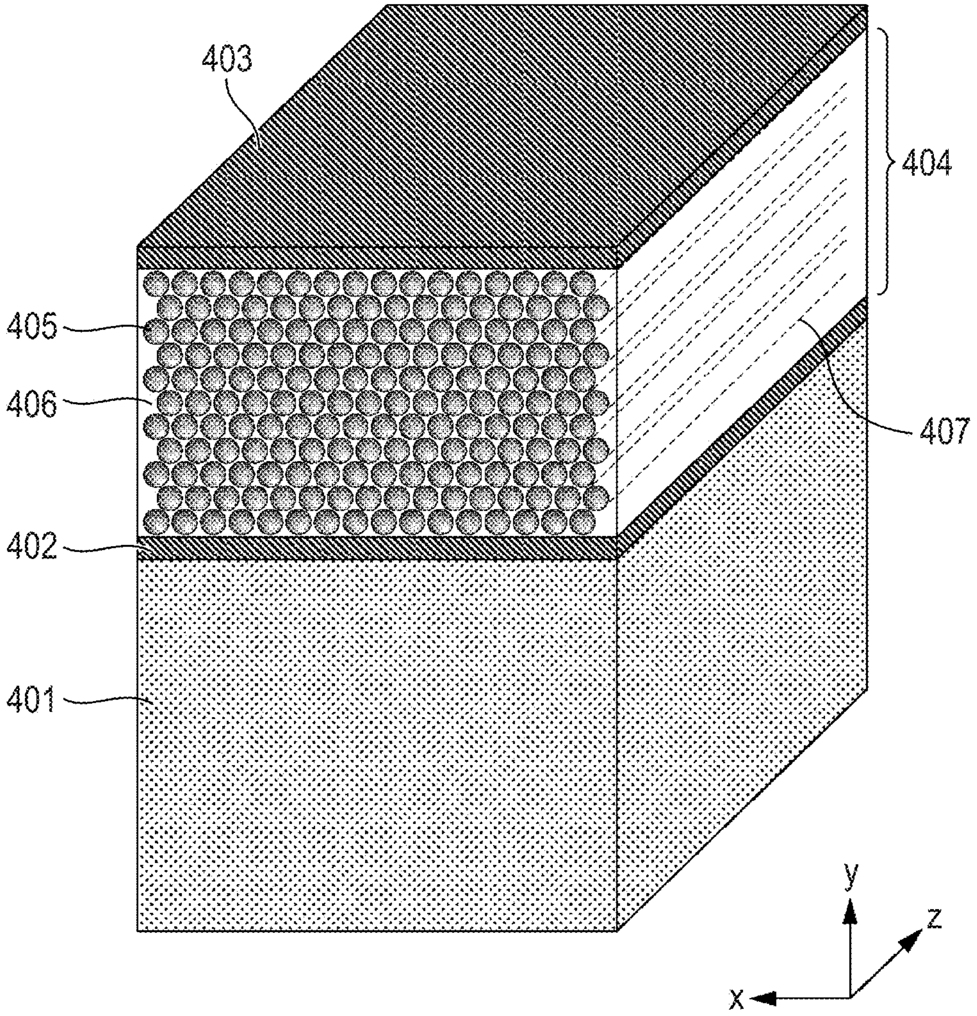
FIG. 4 is a schematic view illustrating an X-ray waveguide of Example 1 of the present invention.

FIG. 4 is a schematic view illustrating an X-ray waveguide of Example 1 of the present invention. In the X-ray waveguide of this example, claddings 402 and 403 each formed of tungsten (W) are formed on a Si substrate 401 so that a core 404 may be interposed between the claddings. The claddings 402 and 403 are each formed so as to have a thickness of about 15 nm by a sputtering method. The core 404 is a mesoporous material. Because the mesoporous material is such that pores 405 each formed of an organic material form a two-dimensional periodic structure in a direction (direction in an x-y plane) perpendicular to the waveguiding direction of an X-ray, the material is a mesoporous silica in which a material for a part 406 except the pores is silicon oxide (silica). The lengthwise direction of each pore is represented by a dotted line 407. A method of producing the mesoporous silica is described in the following sections (a) to (c).

(a) Preparation of Solution of Precursor for Mesostructured Film

A silicon oxide mesostructured film having a 2D-hexagonal structure is prepared by a dip coating method. The solution of the precursor for the mesostructured film is prepared by adding an ethanol solution of a block polymer to a solution described below and stirring the mixture for 3 hours. The solution is obtained by adding ethanol, 0.01 M hydrochloric acid, and tetraethoxysilane and mixing the contents for 20 minutes. As the block polymer, ethylene oxide (20) propylene oxide (70) ethylene oxide (20) (hereinafter, represented as EO(20)PO(70)EO(20) (numbers in parentheses each represent the number of repeats of the respective blocks)) can be used. Methanol, propanol, 1,4-dioxane, tetrahydrofuran, or acetonitrile can be used instead of ethanol. A mixing ratio (molar ratio) "tetraethoxysilane:hydrochloric acid:ethanol: block polymer:ethanol" is set to 1.0:0.0011:5.2:0.0096:3.5. The solution is appropriately diluted before use, for the purpose of adjusting a thickness.

(b) Formation of Mesostructured Film

A washed substrate is subjected to dip coating with a dip coating apparatus at a lifting speed of 0.5 to 2 $mms^{-1}$. At this time, a temperature is 25° C. and a relative humidity is 40%. After having been formed, a film is held in a thermo-hygrostat at 25° C. and a relative humidity of 50% for 24 hours.

(c) Evaluation

The mesostructured film thus prepared is subjected to an X-ray diffraction analysis in a Bragg-Brentano geometry. As a result, it is confirmed that the mesostructured film has high order in the normal direction of the substrate surface and its plane spacing, in other words, its period in a confining direction is 10 nm. The thickness of the film is about 400 nm.

For example, an X-ray having an energy of 17.5 keV is confined in the core 404 by total reflection at a interface between each of the claddings 402 and 403, and the core 404, because the value "period of 10 nm" for the X-ray satisfies the formula (2). The confined X-ray can form a waveguide mode affected by the two-dimensional periodicity of the mesoporous silica.

EXAMPLE 2

An X-ray waveguide of Example 2 of the present invention is formed by: forming each cladding of the X-ray waveguide of Example 1 from Au; and changing the mesoporous silica of the core of the waveguide to a mesoporous titanium oxide. The claddings each formed of Au each have a thickness of about 20 nm. Here, the mesoporous titanium oxide of this example is produced by employing the following steps (a) to (c).

(a) Preparation of Solution of Precursor for Mesostructured Film

A titanium oxide mesostructured film having a 2D-hexagonal structure is prepared by a dip coating method. The solution of the precursor for the mesostructured film is prepared by adding an ethanol solution of a block polymer EO(20)PO(70)EO(20) to a solution described below and stirring the mixture for 3 hours. The solution is obtained by adding tetraethoxytitanium to concentrated hydrochloric acid and mixing the contents for 5 minutes. Methanol, propanol, 1,4-dioxane, tetrahydrofuran, or acetonitrile can be used instead of ethanol. A mixing ratio (molar ratio) "tetraethoxytitanium: hydrochloric acid:block polymer:ethanol" is set to 1.0:1.8: 0.021:14. The solution is appropriately diluted before use, for the purpose of adjusting a thickness.

(b) Formation of Mesostructured Film

A washed substrate is subjected to dip coating with a dip coating apparatus at a lifting speed of 0.5 to 2 $mms^{-1}$. At this time, a temperature is 25° C. and a relative humidity is 40%. After having been formed, a film is held in a thermo-hygrostat at 25° C. and a relative humidity of 50% for 2 weeks.

(c) Evaluation

The mesostructured film thus prepared is subjected to an X-ray diffraction analysis in a Bragg-Brentano geometry. As a result, it is confirmed that the mesostructured film has high order in the normal direction of the substrate surface and its plane spacing, in other words, its period in a confining direction is 11 nm.

Also in this example, an X-ray is confined in the core by total reflection at a interface between each of the claddings, and the core 404 because the value "period of 11 nm" satisfies the formula (2). The confined X-ray can form a waveguide mode affected by the two-dimensional periodicity of the mesoporous titanium oxide.

EXAMPLE 3

An X-ray waveguide of Example 3 of the present invention is obtained by changing the mesoporous silica of the two-dimensional periodic structure as the core of the X-ray waveguide of Example 1 to a zirconium oxide mesostructured film of a three-dimensional periodic structure. The zirconium oxide mesostructured film is formed through steps (a) to (c).

(a) Preparation of Solution of Precursor for Zirconium Oxide Mesostructured Film The zirconium oxide mesostructured film having a 3D cubic structure is prepared by a dip coating method. After a block polymer has been dissolved in an ethanol solvent, zirconium(IV) chloride is dropped to the solution. Further, water is added to the mixture, and then the whole is stirred. Thus, the target solution is prepared. A mixing ratio (molar ratio) "zirconium(IV) chloride:block polymer:water:ethanol" is set to 1:0.005:20:40. An EO(106)PO(70)EO(106) is used as the block polymer.

(b) Film Formation of Mesostructured Film

A washed substrate is subjected to dip coating with a dip coating apparatus at a lifting speed of 0.5 to 2 $mms^{-1}$. At this time, a temperature is 25° C. and a relative humidity is 40%. After having been formed, a film is held in a thermo-hygrostat at 25° C. and a relative humidity of 50% for 2 weeks.

(c) Evaluation

The mesostructured film thus prepared is subjected to an X-ray diffraction analysis in a Bragg-Brentano geometry. As a result, it is confirmed that the mesostructured film has high order in the normal direction of the substrate surface and its plane spacing is 10 nm.

An X-ray is confined in the core by total reflection at a interface between each cladding and the core because the value "period of 10 nm" satisfies the formula (2). The confined X-ray can form a waveguide mode affected by the three-dimensional periodicity of the zirconium oxide mesostructured film body.

EXAMPLE 4

An X-ray waveguide of Example 4 of the present invention is obtained by replacing the pores filled with the organic material of the mesoporous silica of the two-dimensional periodic structure as the core of the X-ray waveguide of Example 1 with air pores. The mesoporous silica film of which the X-ray waveguide of this example is formed is obtained by: forming a mesoporous silica through the steps (a) to (c) described in Example 1; and subjecting the resultant to a baking step to remove the organic material in the pores so that the inside of each pore may be filled with air.

The X-ray waveguide provided in this example is a waveguide that shows an extremely small loss because the inside of each pore is filled with air that shows an extremely small propagation loss of an X-ray. Further, a periodic resonant waveguide mode is three-dimensionally controlled, and for example, its electric field distribution has a periodicity in a three-dimensional direction.

EXAMPLE 5

Figure 5:
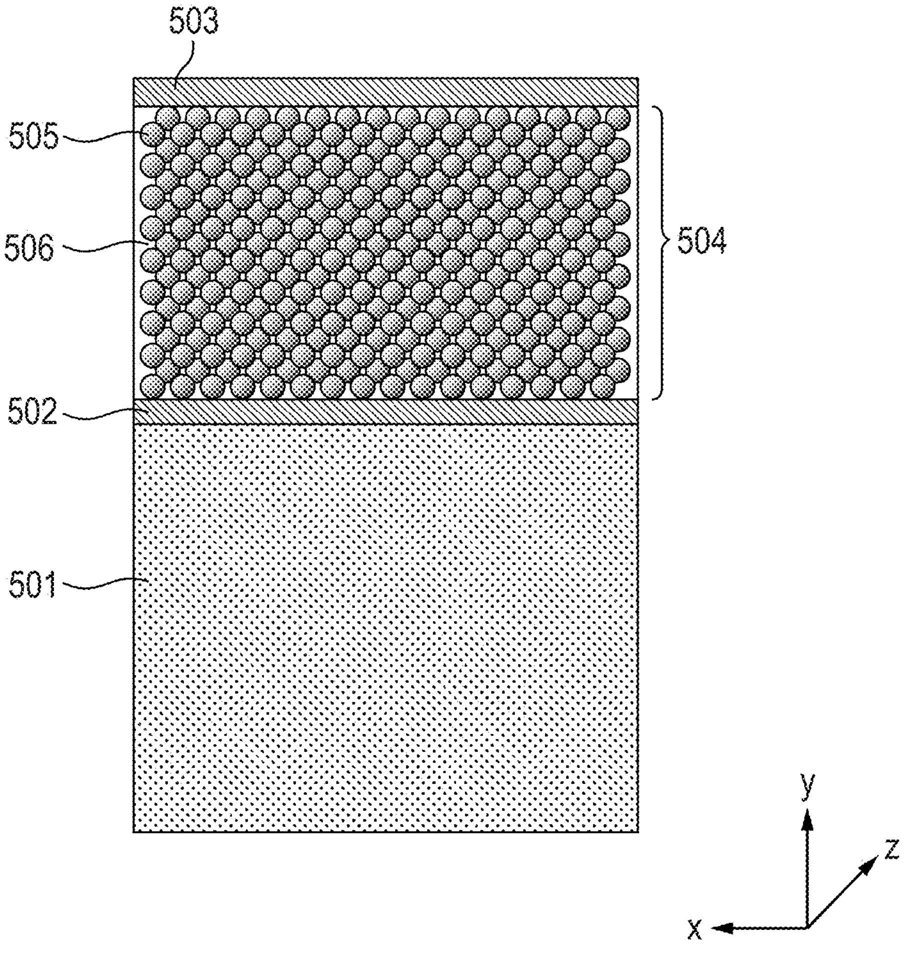
FIG. 5 is a schematic view illustrating an X-ray waveguide of Example 5 of the present invention.

FIG. 5 is a schematic view illustrating an X-ray waveguide of Example 5 of the present invention. The waveguide is of such a configuration as described below. Claddings 502 and 503 each formed of Pt and each having a thickness of about 20 nm are formed on an Si substrate 501, and a core 504 is interposed between the claddings 502 and 503. The core 504 is of the so-called artificial opal structure where polystyrene spheres (particles) 506 each having a diameter of about 50 nm are arranged into a hexagonal close-packed structure in a self-organizing fashion, and is of a three-dimensional periodic structure. When gaps 505 between the arranged polystyrene spheres are filled with Si by a vapor deposition method, the strength of the waveguide can be improved, and a difference in real part of the refractive index between the two materials which contributes to the periodicity of the core can be enlarged.

The diameter of each of the polystyrene spheres is as large as about 50 nm, and hence a plane spacing in a confining direction becomes extremely large, specifically, 20 nm or more. As a result, an X-ray can be strongly confined. Further, a periodic resonant waveguide mode is three-dimensionally controlled, and for example, its electric field distribution has a periodicity in a three-dimensional direction.

INDUSTRIAL APPLICABILITY

The X-ray waveguide of the present invention can be utilized in the field of an X-ray optical technology such as an X-ray optical system for operating an X-ray output from, for example, a synchrotron, or a part for use in an X-ray optical system in an X-ray imaging technology, an X-ray exposure technology, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-127340, filed Jun. 2, 2010, Japanese Patent Application No. 2010-262877, filed Nov. 25, 2010 and Japanese Patent Application No. 2011-101310, filed Apr. 28, 2011 which are hereby incorporated by reference herein in their entirety.

REFERENCE SIGNS LIST

101 pore
102 silica part
103 example of unit structure
402 cladding
403 cladding
404 core
405 pore
406 silica
407 dotted line

The invention claimed is:

1. An X-ray waveguide, comprising:
a core for guiding an X-ray in such a wavelength band that a real part of the refractive index of a material is 1 or less; and
a cladding for confining the X-ray in the core, wherein:
the core and the cladding are formed so that the X-ray is confined in the core by total reflection at a interface between the core and the cladding and thus the X-ray is guided;
the core has a two or more-dimensional periodic structure in which multiple materials having different real parts of the
refractive index are periodically arranged in a two-dimensional direction perpendicular to the waveguiding direction; and
the X-ray waveguide has such a waveguide mode that the number of one of antinodes and nodes of one of an electric field intensity distribution and a magnetic field intensity distribution of the X-ray coincides with the number of periods of the periodic structure in a direction perpendicular to a waveguiding direction of the X-ray in the core.

2. An X-ray waveguide according to claim 1, wherein part of the core serves as the cladding.

3. An X-ray waveguide according to claim 1, wherein at least one material out of the multiple materials comprises an oxide.

4. An X-ray waveguide according to claim 1, wherein the core contains a mesoporous material.

5. An X-ray waveguide according to claim 1, wherein the core has a structure in which particles are periodically arranged in a three-dimensional direction.

6. An X-ray waveguide according to claim 1, wherein the number of periods of the periodic structure is 20 or more in the direction perpendicular to the waveguiding direction of the X-ray.

* * * * *